(12) United States Patent
Tomozaki et al.

(10) Patent No.: US 7,640,374 B2
(45) Date of Patent: Dec. 29, 2009

(54) DATA TRANSFER APPARATUS BY DIRECT MEMORY ACCESS CONTROLLER

(75) Inventors: Toshihiro Tomozaki, Kawasaki (JP);
Toshiyuki Yoshida, Kawasaki (JP);
Yuichi Ogawa, Kawasaki (JP);
Terumasa Haneda, Kawasaki (JP);
Yuuji Hanaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 190 days.

(21) Appl. No.: 11/196,469

(22) Filed: Aug. 4, 2005

(65) Prior Publication Data

US 2006/0161694 A1 Jul. 20, 2006

(30) Foreign Application Priority Data

Jan. 14, 2005 (JP) ............................. 2005-008008

(51) Int. Cl.
*G06F 3/00* (2006.01)
*G06F 12/00* (2006.01)
(52) U.S. Cl. ........................................ 710/22; 711/118
(58) Field of Classification Search .................. 710/22; 711/154, 118
See application file for complete search history.

(56) References Cited

U.S. PATENT DOCUMENTS 6,708,234 B2 * 3/2004 Moteki et al. ................ 710/22
7,034,838 B2 * 4/2006 Obata et al. ................. 345/537
7,185,151 B2 * 2/2007 Michiie et al. .............. 711/154
7,240,350 B1 * 7/2007 Eberhard et al. ............ 719/314

FOREIGN PATENT DOCUMENTS

| JP | 06-96007 | 4/1994 |
|---|---|---|
| JP | 10-49479 | 2/1998 |
| JP | 2003-198817 | 7/2003 |
| JP | 2004-40637 | 2/2004 |

OTHER PUBLICATIONS

Patent Abstracts of Japan, Publication No. 06-096007, published Apr. 8, 1994.
Patent Abstracts of Japan, Publication No. 10-049479, published Feb. 20, 1998.
Patent Abstracts of Japan, Publication No. 2004-040637, published Feb. 5, 2004.
Office Action dated Jun. 30, 2009 in Japanese Application No. 2005-008008.

* cited by examiner

*Primary Examiner*—Henry W. H. Tsai
*Assistant Examiner*—Hyun Nam
(74) *Attorney, Agent, or Firm*—Staas & Halsey LLP

(57) ABSTRACT

A DMA apparatus which reads data corresponding to a descriptor from memory, and a dividing unit in a descriptor management device divides one descriptor into a plurality of sub-descriptors. A plurality of DMA controllers produce a plurality of reading requests for reading data corresponding to the plurality of sub-descriptors from the memory. A memory controller reads the corresponding data from the memory according to the plurality of reading requests.

12 Claims, 10 Drawing Sheets

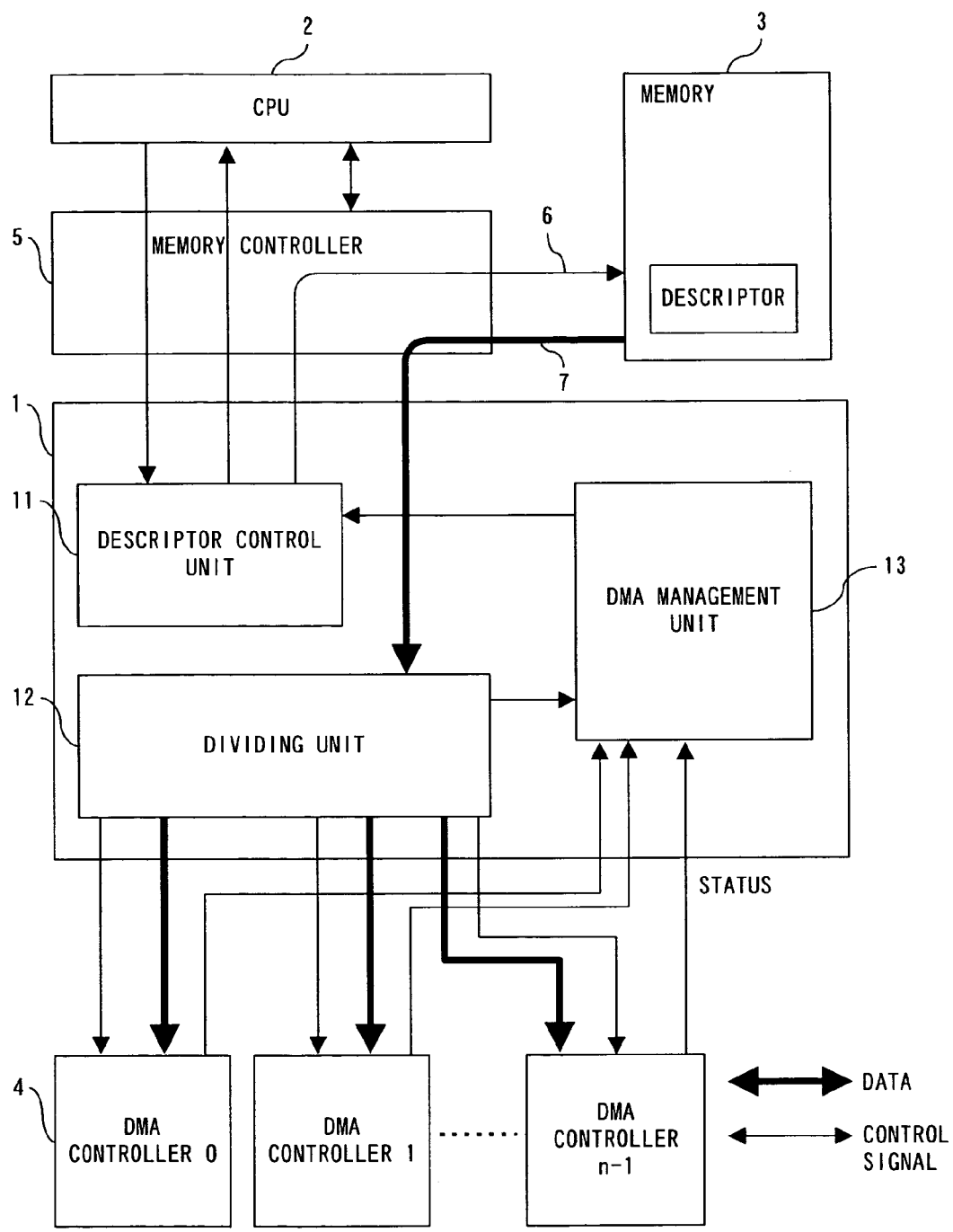
F I G. 1

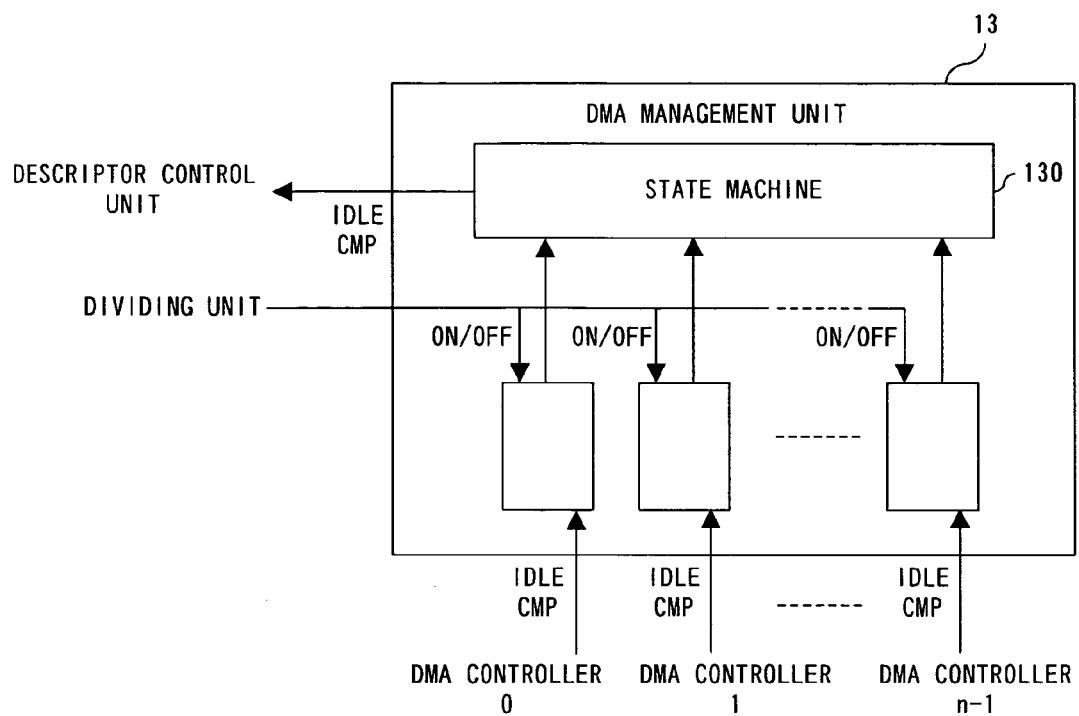
F I G. 5

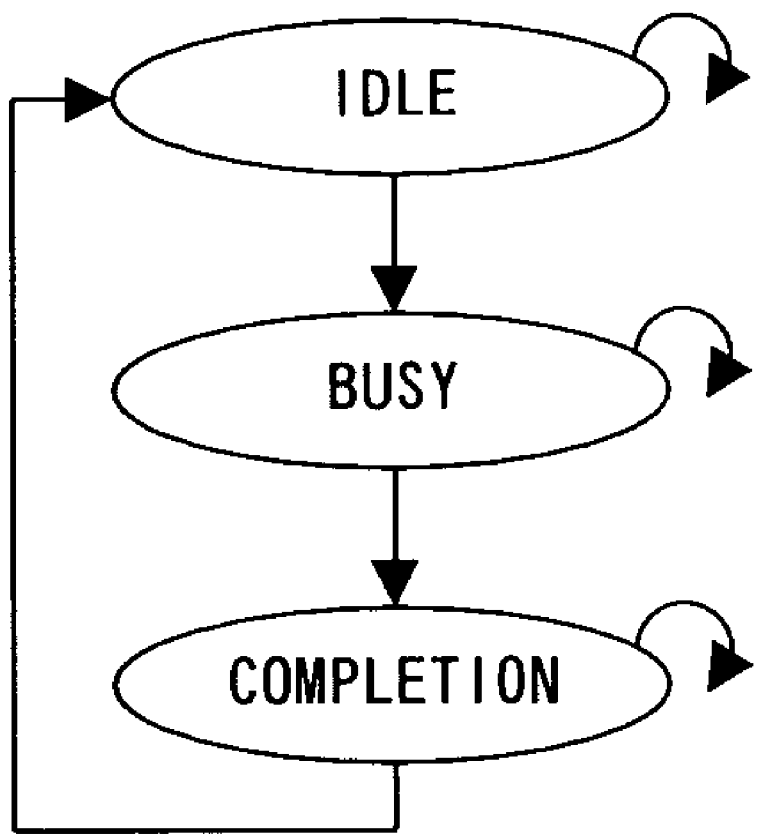
F I G. 6

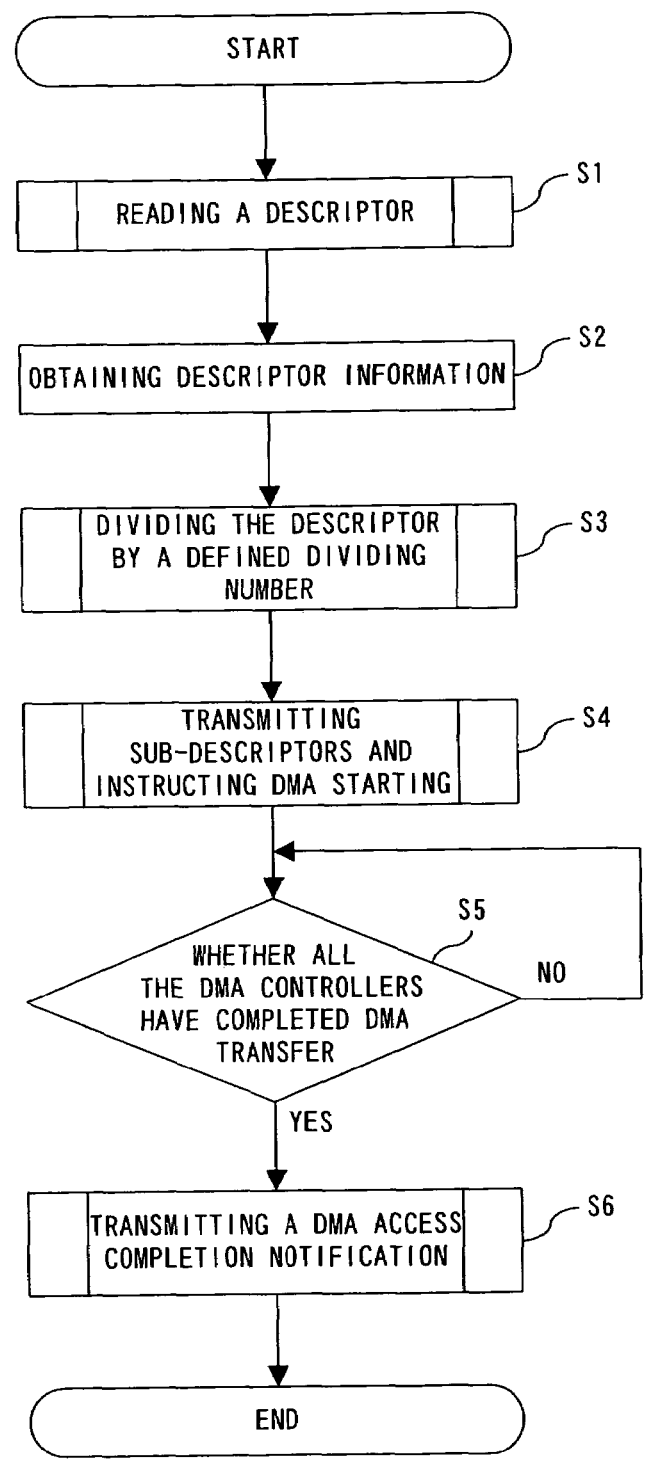
F I G. 7

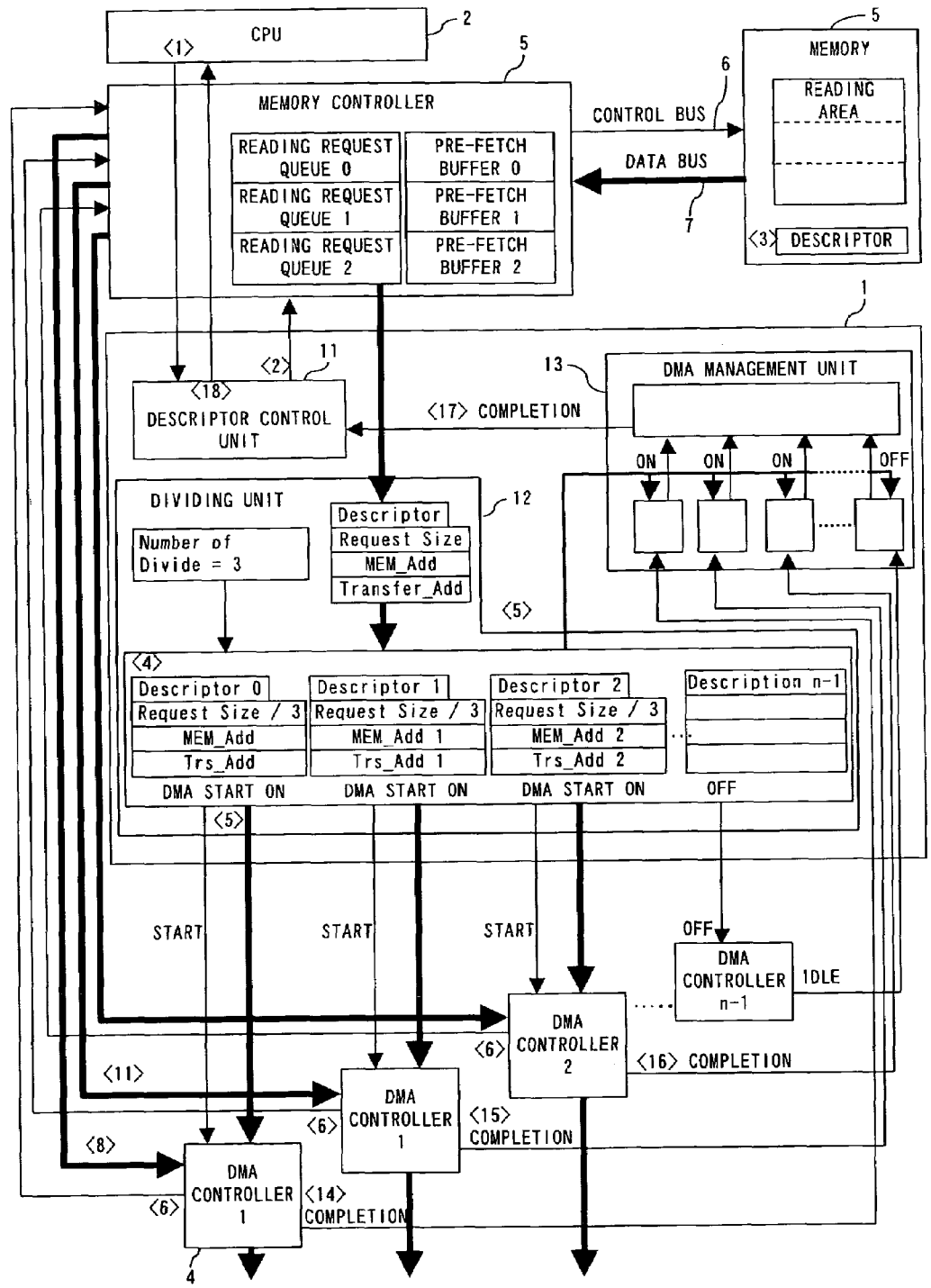
F I G. 9

DATA TRANSFER APPARATUS BY DIRECT MEMORY ACCESS CONTROLLER

BACKGROUND OF THE INVENTION

1. Field of the Invention

The present invention relates to a method of transferring data by a direct memory access (DMA) controller.

2. Description of the Related Art

DMA transfer has been well known as a technology for reducing the offload on a CPU when data is read from memory. As disclosed in unexamined patent publication No. 2003-198817, in DMA transfer, a DMA controller reads desired data using a descriptor which is memory area management information. In the patent document, image data is read from a specific area of image memory based on the descriptor taken out from the memory with reference to the storage area of data. By dividing transfer units of data using the descriptor of the DMA controller and implementing data transfer in time division, data transfer can be made to operate as if a plurality of data transfer were being implemented in parallel.

FIG. 10 shows the sequence of the conventional processing in which the DMA controller reads the data designated by the descriptor. For example, when an instruction directing that desired data should be read is inputted from another device such as a keyboard and a mouse, firstly, the DMA controller 4 reads the descriptor. Next, the DMA controller 4 reads the data from the memory area designated by the descriptor. Then, the read data is transferred to a device of the transfer destination.

Numbers in parentheses shown in FIG. 10 indicate the order for implementing DMA transfer processing. Described below is the DMA transfer processing related to the prior art in the order of the numbers shown in the figure.

<1> The CPU 2 instructs the DMA controller 4 to read the descriptor stored in the memory 3.

<2> The DMA controller 4 requests the memory controller 5 to read the descriptor.

<3> The DMA controller 4 receives the descriptor read from the memory 3 via the memory controller 5.

<4> The DMA controller 4 requests the memory controller 5 to read the data stored in the area designated by the received descriptor in the memory 3. The memory controller 5 implements advance-preparation processing and processing of waiting for the assignment of the right to use buses during a period from the time when the memory controller 5 receives a request for data reading from the DMA controller 4 to the time when the memory controller 5 transmits the request for data reading to the memory 3, namely before the memory controller 5 actually implements the processing of reading the data from the memory 3. When the right to use a bus is assigned, the memory controller 5 proceeds to the processing of <5>.

<5> The memory controller 5 begins to read the data from the memory 3.

<6> The data is read from the memory 3 based on the descriptor. The data read from the memory 3 is transferred to the memory controller 5 via the data bus 7, and the data is stored in the pre-fetch buffer in the memory controller 5.

<7> The memory controller 5 successively transfers the data stored in the pre-fetch buffer to the DMA controller 4. When the processing speed for storing data in the pre-fetch buffer is compared with the processing speed for transferring the data in the pre-fetch buffer to the DMA controller 4, generally the speed required for the transfer processing is slower. Consequently, the data acquired from the memory 3 is gradually accumulated in the pre-fetch buffer. Thus, when the amount of data in the pre-fetch buffer exceeds a prescribed value, the memory controller 5 releases the request once for data reading from the memory 3 corresponding to the descriptor. That is to say, the memory controller 5 releases the data bus 7.

<8> The memory controller 5 continuously implements advance-preparation processing for reading the data which has not been transferred from the memory 3, and requests the use of buses for obtaining the right to use the control bus 6 and data bus 7 again.

<9> After obtaining the right to use the control bus 6 and the data bus 7, the memory controller 5 reads the data which has not been transferred from the memory 3 and successively transfers the data to the DMA controller 4 via the data bus 7.

After then, the same processing as <5> through <8> is repeated until all the data which the DMA controller 4 requests is read from the memory 3.

<10> When the transfer to the DMA controller 4 of data equivalent to the amount of data which the DMA controller 4 requests is completed, the DMA controller 4 transmits a notification of the completion of transfer to DMA to the CPU 2 and terminates the processing. The data read from the memory 3 is transferred to a prescribed device from the DMA controller 4.

In the conventional DMA transfer method, when reading of data corresponding to one descriptor from the memory 3 is implemented two times or more, it is necessary to implement advance-preparation processing and wait until the right to use the buses is assigned each time, as shown in FIG. 10. Here, while the memory controller 5 is implementing the advance-preparation processing and is waiting for the right to use the buses, the data bus 7 is not used. In other words, in the conventional technology, the period in which the data bus 7 is not used arises each time a prescribed amount of data is read from the memory 3 and is transferred to the memory controller 5.

Each time the memory controller 5 requests that the data which has not been transferred should be read from the memory 3, it is necessary to implement the advance-preparation processing and the processing for obtaining the right to use the control bus 6 and the data bus 7. Consequently, each time data equivalent to a prescribed amount of data is taken out from the memory 3 to the pre-fetch buffer in the memory controller 5, a period in which the data bus 7 is not used for data transfer due to memory latency arises. From the viewpoint of improving the use efficiency of the buses, namely, throughput in DMA transfer, it is preferable to shorten the period in which the data bus 7 is not used.

SUMMARY OF THE INVENTION

The purpose of the present invention is to provide a technology which can improve throughput in DMA transfer when the DMA transfer of data corresponding to one descriptor is requested.

The present invention is a DMA apparatus which reads data corresponding to a descriptor from memory in order to accomplish the purpose, and the DMA apparatus comprises a dividing unit for dividing one descriptor into a plurality of sub-descriptors, a plurality of DMA controllers which produce a plurality of reading requests for reading data corresponding to the plurality of sub-descriptors from the memory, and a memory controller which reads the corresponding data from the memory according to the plurality of reading requests.

When data corresponding to a descriptor is read from the memory, the descriptor is divided into a plurality of sub-descriptors. The DMA controller which receives one sub-descriptor produces a reading request for reading data corresponding to the sub-descriptor from the memory. The memory controller, when receiving the reading request transmitted from a plurality of DMA controllers, reads the data corresponding to each sub-descriptor and transfers the data to each corresponding DMA controller. Since the processes related to the reading of data corresponding to a plurality of sub-descriptors partially overlap with each other, memory latency is absorbed, and throughput in DMA transfer can be improved.

The DMA system further comprises a DMA controller management unit for managing the status of the plurality of DMA controllers, and the dividing unit may be made to divide the descriptor into a plurality of sub-descriptors by the number of the DMA controllers which are determined by the DMA controller management unit to be in a state in which data can be read from the memory. Since the number of DMA controllers which can read data is grasped by the DMA controller management unit, it is possible to divide the descriptor to an appropriate number.

The memory controller comprises a plurality of buffer circuits, and the plurality of buffer circuits may be made to read data corresponding to the sub-descriptor from the memory and store the data. Moreover, some of the buffer circuits may be made to implement advance-preparation processing for reading data from the memory while other buffer circuits are implementing data reading from the memory. Or, the buffer circuits may be made to begin the processing of reading data from the memory when the buffer circuits are assigned the right to use the buses between the memory and the buffer circuits after implementing the advance-preparation processing.

By employing such a configuration as this, it is possible to make these buffer circuits implement preparatory processing for data reading in advance while some other buffer circuits are reading data based on the sub-descriptors. When data reading by the other buffer circuits is completed, reading of data can be immediately begun, so that the efficiency in using the buses can be improved.

The present invention is not limited to the DMA apparatus. Even a method of implementing the processing of reading data corresponding to a sub-descriptor from memory based on sub-descriptors into which the descriptor is divided, and a apparatus which produces sub-descriptors and realizes such processing, and the like are included in the present invention.

According the present invention, a memory controller is made to implement data reading using a divided descriptor (sub-descriptors). In plurality of memory controllers, the processes which cause memory latency are partially implemented by overlapping with each other in terms of time, so the period in which the data bus which is the transmission path of data when the memory controller reads data from the memory is shortened, and throughput in DMA transfer processing can be improved.

BRIEF DESCRIPTION OF THE DRAWINGS

FIG. 1 shows the whole of the circuits related to DMA transfer.

FIG. 5 shows the circuit configuration of a DMA management unit;

FIG. 6 shows the transition of the statuses of a DMA controller which is managed by the DMA management unit;

FIG. 7 is a flowchart showing the basic operation of the descriptor management device related to the embodiment of the present invention;

FIG. 9 shows the data flow in the DMA transfer related to the embodiment of the present invention which is shown in association with the configuration of the descriptor management device.

DETAILED DESCRIPTION OF THE PREFERRED EMBODIMENTS

Figure 2:
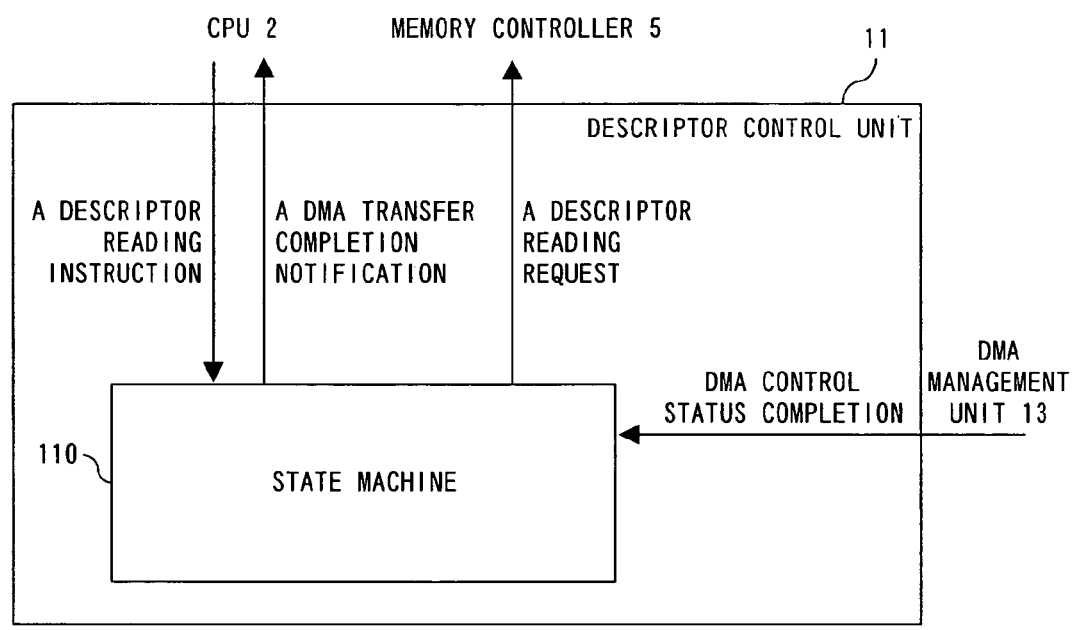
FIG. 2 shows the configuration of a descriptor control unit.

Described below is a preferred embodiment of the present invention with reference to the accompanying drawings.

FIG. 1 shows the whole of the circuits related to DMA transfer. The circuits comprise a descriptor management device 1, memory 3, a DMA controller 4 and a memory controller 5.

As the information stored in the memory 3, there are various kinds of data such as image data, a descriptor which is memory area management information in which such various data is stored, etc. In DMA transfer, the DMA controller 4 determines the address in which various kinds of data are stored based on the descriptor, and transfers read data to a designated device. A plurality of DMA controllers 4 are provided in the embodiment of the present invention. The memory controller 5 transmits or receives a control signal to and from the memory 3 via a control bus 6, and transmits and receives data to and from the memory 3 via a data bus 7. In the DMA transfer related to the present invention, when a CPU 2 gives an instruction that a prescribed descriptor (memory area management information) should be read, the descriptor management device 1 reads the descriptor and divides it. Then, the DMA controller 4 reads data from the memory 3 based on a plurality of memory area management information which is produced by dividing the descriptor, and transfers the read data to the device. Memory area management information such as divided address information which is used when the DMA controller 4 reads data is defined as a sub-descriptor in this embodiment.

The descriptor management device 1 comprises a descriptor control unit 11, a dividing unit 12, and a DMA management unit 13. Described below is the descriptor management device 1 with reference to FIG. 2 through FIG. 6

FIG. 2 shows the configuration of the descriptor control unit 11. The descriptor control unit 11 requests the memory controller 5 to read the descriptor based on a descriptor reading instruction from the CPU 2. Also, when recognizing that the transfer of data corresponding to the descriptor has been completed, the descriptor control unit 11 notifies the CPU 2 that the processing of DMA transfer has been completed. The statuses of the descriptor management device 1 are controlled by the state machine 110 contained in the descriptor control unit 11.

Figure 3:
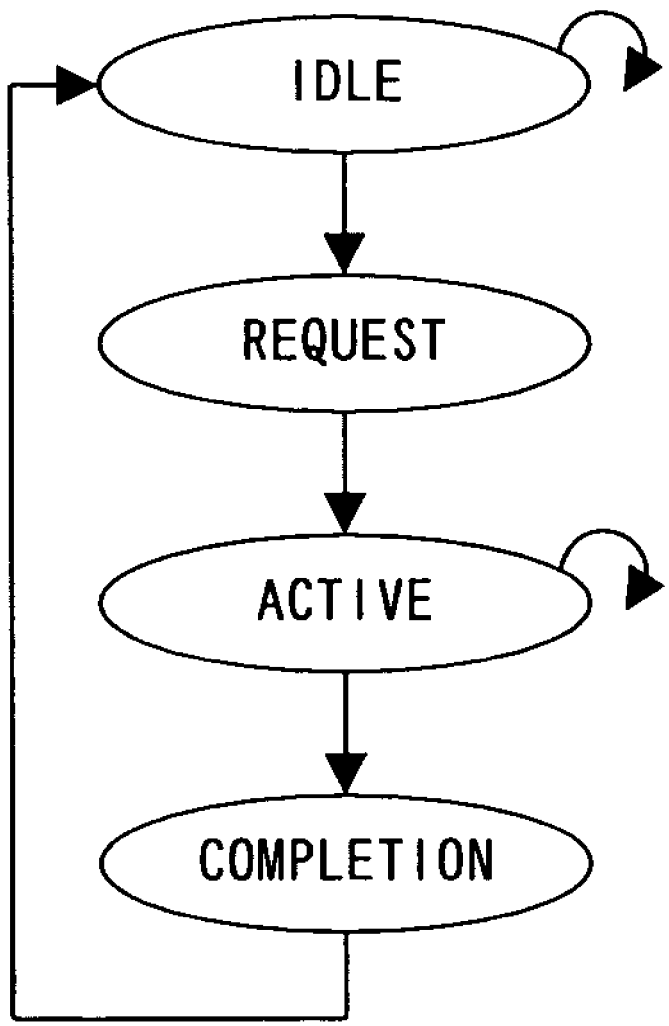
FIG. 3 shows the transition of the statuses of a descriptor management device which is managed by a state machine in the descriptor control unit.

FIG. 3 shows the transition of the statuses of the descriptor management device 1 which is managed by the state machine 110. The descriptor management device 1 undergoes four statuses, i.e. idle status, request status, active status, and completion status, in that order, as shown in FIG. 3. The state machine 110 monitors the statuses of the descriptor management device 1 in a prescribed interval of time (one cycle), and recognizes that the descriptor management device 1 has shifted to a next status when prescribed conditions satisfy each of the four statuses.

In the idle status, the descriptor management device 1 has not yet implemented DMA transfer, and when the descriptor management device 1 receives an instruction on descriptor reading from the CPU 2 while the descriptor management device 1 is in the idle status, the descriptor management device 1 begins the DMA transfer related to this embodiment. In the request status, the descriptor management device 1 transmits a descriptor reading request to the memory controller 5, and waits for receiving of the descriptor. After one cycle has passed, the status shifts from the request status to the active status.

In the active status, data is being transferred from the memory 3 to the DMA controller 4, and the descriptor management device 1 waits for receiving a notification that DMA transfer has been completed and processing has been completed from the DMA controller 4 related to the DMA transfer. When receiving the notification of transfer completion, the descriptor management device 1 shifts from the active status to the completion status.

In the completion status, the descriptor management device 1 notifies the CPU 2 that DMA transfer has been completed. After one cycle has passed, the status shifts to the idle status.

Figure 4:
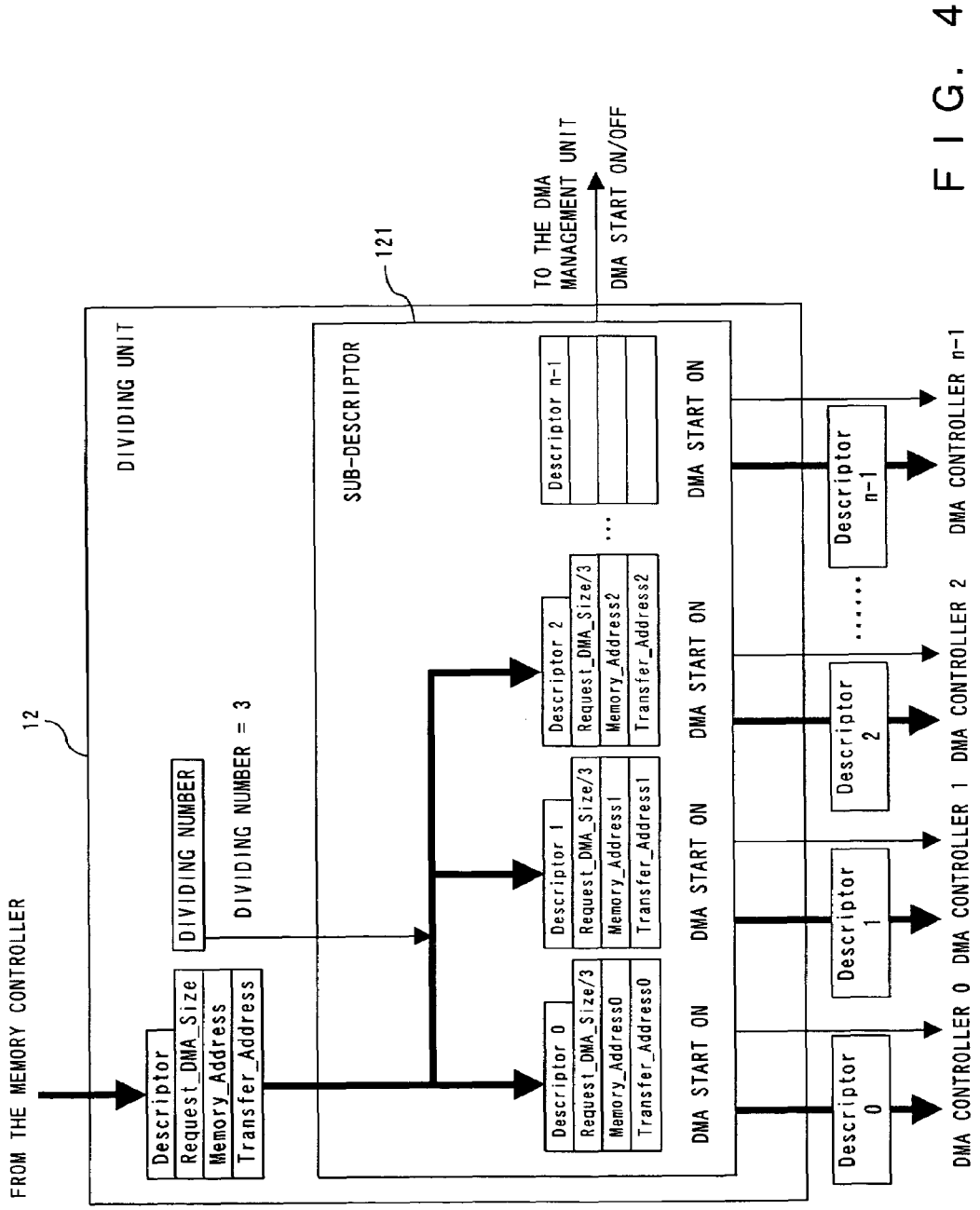
FIG. 4 shows the circuit configuration of a dividing unit.

FIG. 4 shows the circuit configuration of a dividing unit 12. The dividing unit 12 receives the descriptor read from the memory 3 via the memory controller 5, and divides the received descriptor into a plurality of sub-descriptors. In this embodiment, the number of divides shall be fixed as three hereinafter. Sub-descriptors produced by dividing a descriptor into three pieces are allocated to three DMA controllers 4 which implement DMA transfer.

The sub-descriptors 0, 1, and 2 produced by dividing a descriptor into three pieces have a data configuration, for example, as shown in the sub-descriptor 121. The sub-descriptor 121 comprises the information such as the size of data to be read, an address on the memory 3, and an address of a transfer destination data which is requested to the memory 3, as shown in FIG. 4. For example, when data of 10K bytes is read, the size of data which is read by one descriptor is, for example, 10/3=3.3K bytes. The DMA controllers 4 to which sub-descriptors have been allocated read data of a prescribed size from the address on the memory 3 based on the stored information and transfer the read data to the address of the transfer destination.

FIG. 5 shows the circuit configuration of the DMA management unit 13. The DMA management unit 13 receives a signal for transmitting the statuses of the DMA controllers 4 from the plurality of DMA controllers 4 connected. The signal received from the plurality of DMA controllers is given to the state machine 130 contained in the DMA management unit 13. The state machine 130 manages the statuses of each DMA controller 4, and transmits the information to the descriptor control unit 11. The descriptor control unit 11 judges whether DMA transfer is being implemented from the statuses of the DMA controller 4.

FIG. 6 shows the transition of the statuses of each DMA controller 4 which is managed by the DMA management unit 13. The DMA controller 4 undergoes three statuses, i.e. idle status, busy status, and completion status, in order, as shown in FIG. 6. The state machine 130 in the DMA management unit 13 monitors the statuses of the DMA controller 4 in a prescribed interval of time (one cycle), and recognizes that the DMA controller 4 has sifted to a next status when prescribed conditions for each of three statuses are satisfied. The DMA controller 4 which is monitored by the state machine 130 can be all the DMA controllers 4 connected to the descriptor management device 1 or a prescribed number of DMA controllers 4.

In the idle status, the whole of the plurality of DMA controllers 4 to be managed is not used. When DMA transfer is begun in the DMA controller 4 in the idle status, the DMA controller 4 shifts to the busy status after one cycle has passed. In the busy status, the DMA controller 4 is implementing the processing of DMA transfer, and when the processing has finished for all the DMA controllers 4 related to the transfer processing, the DMA controller shifts to the completion status. In the completion status, which all the DMA controllers 4 related to the processing has completed the DMA transfer processing is notified to the descriptor control unit 11. The status shifts to the idle status after one cycle has passed.

FIG. 7 is a flowchart showing the basic operation of the descriptor management device 1 related to the embodiment of the present invention. Described below is the outline of a method in which the descriptor management device 1 produces sub-descriptors by dividing a descriptor and implements DMA transfer with reference to FIG. 7.

When receiving an instruction from the CPU 2, the descriptor management device 1 implements the processing of reading the descriptor in Step Si. In Step S2, the descriptor management device 1 acquires descriptor information related to the descriptor. In Step S3, the descriptor management device 1 divides the descriptor received to a prescribed number and produces a plurality sub-descriptors. In Step S4, the descriptor management device 1 transfers the plurality of sub-descriptors produced to respective corresponding DMA controllers 4, and transmits an instruction of DMA starting to begin DMA transfer in the DMA controllers 4.

When DMA transfer is begun, in Step S5, all the DMA controllers 4 which are in the active status enter the operation of waiting for the completion of DMA transfer in the descriptor management device 1. When the DMA transfer of all the DMA controllers 4 which are in the active status is completed, the descriptor management device 1 transmits a DMA access completion notification to the CPU 2 in Step S6 and completes the processing.

Figure 8:
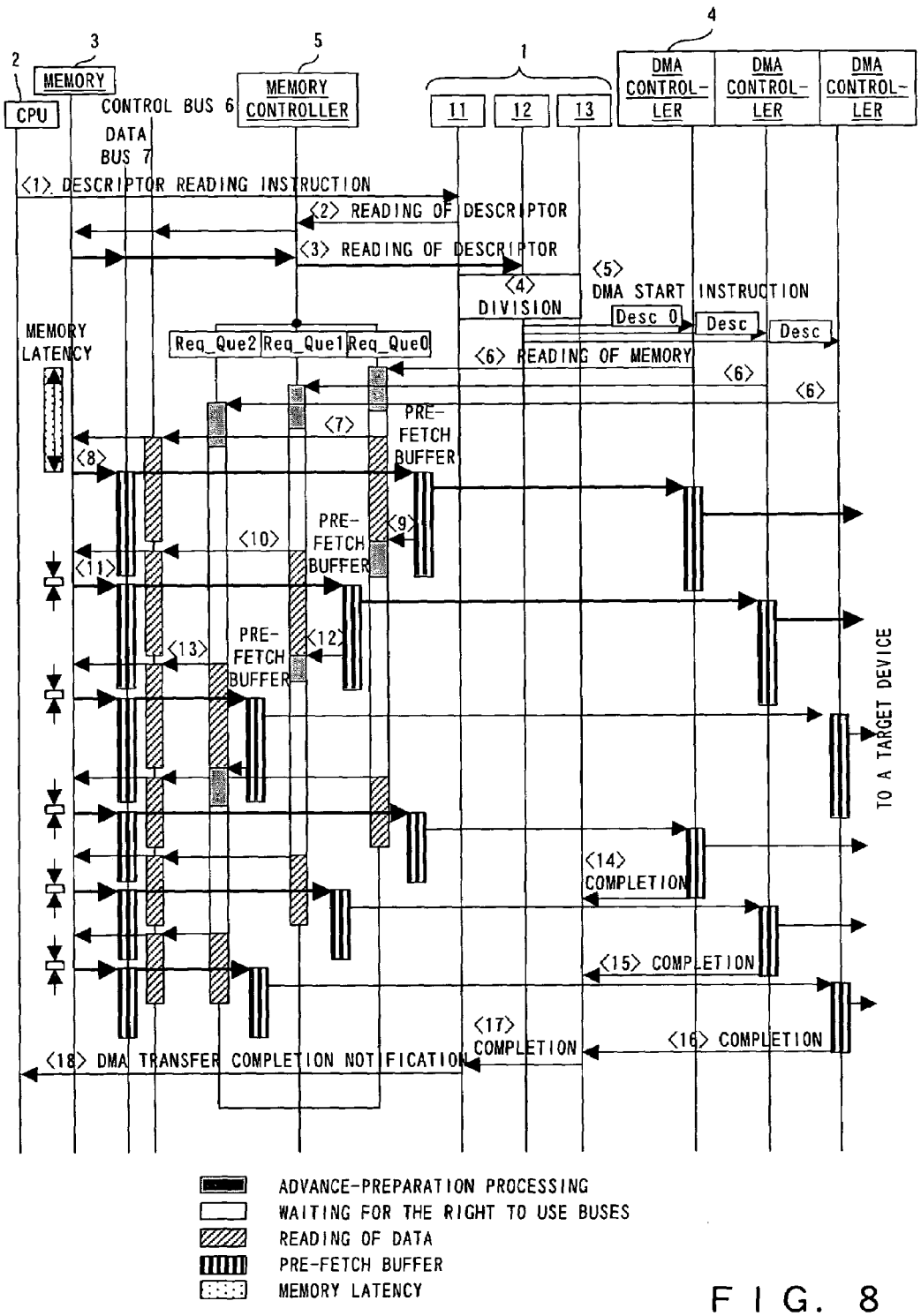
FIG. 8 shows the sequence of DMA transfer by a plurality of DMA controllers using sub-descriptors which are produced by dividing a descriptor.
Figure 10:
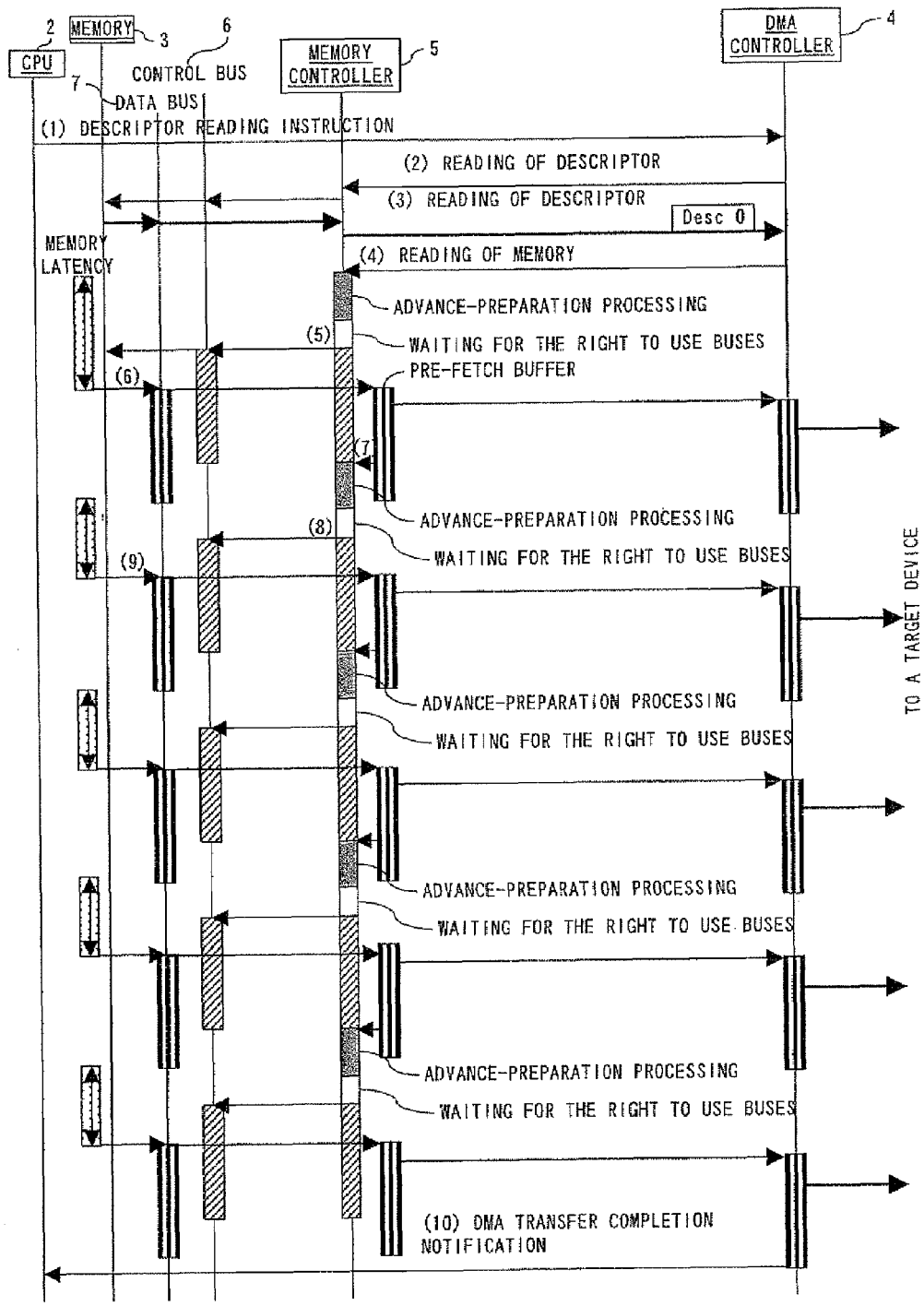
FIG. 10 shows the sequence of the conventional processing in which the DMA controller reads desired data based on one descriptor which the DMA controller reads.

FIG. 8 shows the sequence of DMA transfer by a plurality of DMA controllers 4 using sub-descriptors which are produced by dividing a descriptor. FIG. 9 shows the data flow in the DMA transfer related to the embodiment of the present invention which is shown in association with the configuration of the descriptor management device 1. The processing procedures in brackets shown in FIG. 9 are shown in association with the processing procedures in brackets shown in FIG. 8. Described below are the details of the processing of the descriptor management device 1 related to this embodiment and other devices connected to the descriptor management device 1 in line with the numbers in brackets with reference to FIG. 8 and FIG. 9.

<1> The CPU 2 instructs the descriptor management device 1 to read a descriptor.

<2> When the status of the DMA controller 4 which is notified by the DMA management unit 13 is the idle status, the descriptor control unit 11 transmits a descriptor reading request to the memory controller 5.

<3> The descriptor management device 1 receives the descriptor read from the memory 3.

<4> The dividing unit 12 divides the received descriptor into three, and produces three sub-descriptors, 0, 1, and 2.

<5> The produced sub-descriptors, 0, 1, and 2 are respectively transmitted to the three DMA controllers 4 which are in the idle status, and an instruction to request the starting of DMA transfer is transmitted.

<6> Each DMA controller 4 transmits memory reading requests to the memory controller 5. The memory controller 5 which receives the reading requests allocates a queue in association with the three reading requests. Here, the queue implements three processing operations when reading data from the memory 3. In this embodiment, the three processing operations are an advance-preparation processing operation, an operation of waiting for the assignment of the right to use buses, and a reading operation. Here, memory latency related to this embodiment corresponds to the period in which the advance-preparation processing operation and the operation of waiting for the assignment of the right to use the buses are implemented. Each of the three queues allocated in this embodiment implements the advance-preparation processing operation and the operation of waiting for the assignment of the right to use the buses independently of other queues, and when each of the three queues recognizes that other queues are not implementing the reading operation, each of the three queues obtains the right to use the buses and implements the reading operation. The three queues are called queue (0), queue (1), and queue (2) in the order of the queue which receives the reading request from the DMA controllers 4 and begins to implement a series of processing operations. Each of the three queues implements the advance-preparation processing operation and enters the operation of waiting for the assignment of the right to use the buses.

<7> First, queue (0) acquires the right to use the buses and implements the reading processing.

<8> Data which is read from the memory 3 and corresponds to the sub-descriptor 0 is stored in the pre-fetch buffer of the memory controller 5. A plurality of pre-fetch buffers are provided in the memory controller 5, and three pre-fetch buffers are provided in this embodiment, and data read by the three queues is stored in each pre-fetch buffer. Queues and pre-fetch buffers operate as a buffer circuit in this embodiment, and the buffer circuit is used to implement a series of processes related to data reading and store the read data.

<9> The data stored in the pre-fetch buffers is successively transferred to the DMA controllers 4. The DMA controllers 4 transfer the data to the devices of transfer destinations. However, when the speed of the processing of storing the data in the pre-fetch buffers is compared with the speed of the processing of reading the data from the pre-fetch buffers and transferring the data to the devices, generally, the speed required for transferring the data is slower. Consequently, the data is gradually accumulated in the pre-fetch buffers. Thus, when the amount of data in the pre-fetch buffers exceeds a prescribed value, the memory controller 5 once releases the reading request to the sub-descriptor 0. That is to say, the data bus 7 is released. In this embodiment, the amount of data to be read is supposed to be 10K bytes, and the capacity of data which can be stored in the pre-fetch buffers is supposed to be 2K bytes.

<10> When the bus is released, the queue (1) which is in the status of waiting for the assignment of the right to use the buses acquires the right to use the buses and begins the processing of reading. Since queue (1) has completed the advance-preparation processing operation in <6> and is implementing the operation of waiting for the assignment of the right to use the buses, queue (1) begins the operation of reading the data immediately when the right to use the buses is assigned. In order to read the data which has not been received yet, from the memory 3, queue (0) implements the advance-preparation processing operation and the operation of waiting for the assignment of the right to use the buses again, and waits for the assignment of the right to use the buses.

<11> The data which is read from the memory 3 and which corresponds to the sub-descriptor 1 is stored in the pre-fetch buffers in the memory controller 5.

<12> Like the processing of <9>, the data stored in the pre-fetch buffers is successively transferred to the DMA controllers 4. The memory controller 5, when reading the data of 2K bytes which is the amount of data which does not exceed the capacity of the pre-fetch buffers, once releases the request of memory reading to the sub-descriptor 1.

<13> When the buses are released, the queue (2) which is in the status of waiting for the assignment of the right to use the buses acquires the right to use the buses and begins the processing of reading. Like the queue (1) in the processing of <10>, in the processing of <6>, queue (2) has completed the advance-preparation processing operation and is implementing the operation of waiting for the assignment of the right to use the buses, so queue (2) begins the operation of data reading immediately when the right to use the buses is assigned. Queue (1) implements the same processing as queue (0) in the processing of, <10>, and waits for the assignment of the right to use the buses.

Hereinafter, when a prescribed amount of data is read from the memory 3 and is stored in the pre-fetch buffers in the memory controller 5 in the same way as before, the buses are once released, and the queue which is in the status of waiting for the assignment of the right to use a next bus acquires the right to use the bus, and begins the processing of reading. The data stored in the pre-fetch buffers is successively transferred to the corresponding DMA controllers.

<14> The DMA transfer of the data of 2+1.3=3.3K bytes corresponding to the sub-descriptor 0 is completed, and the corresponding DMA controller 4 transmits a completion notification to the descriptor management device 1.

<15> The DMA transfer of the data of 2+1.3=3.3K bytes corresponding to the sub-descriptor 1 is completed, and the corresponding DMA controller 4 transmits a completion notification to the descriptor management device 1.

<16> The DMA transfer of the data of 2+1.3=3.3K bytes corresponding to the sub-descriptor 2 is completed, and the corresponding DMA controller 4 transmits a completion notification to the descriptor management device 1.

<17> The DMA management unit 13 in the descriptor management device 1, when receiving a completion notification from three DMA controllers 4, recognizes that the DMA transfer relating to one descriptor which is read in <2> has been completed, and transmits a processing completion notification to the descriptor control unit 11.

<18> The descriptor control unit 11 transmits a DMA transfer completion notification to the CPU 2.

When data reading from the memory 3 corresponding to one descriptor is implemented by a plurality of sub-descriptors two times or more, neither the advance-preparation processing operation nor the operation of waiting for the assignment of the right to use the bus needs to be implemented each time, but these operations are implemented in advance. Consequently, in the buffer circuit in which the right to use the bus is assigned, data reading processing can be immediately implemented, and the time when the buses are not used can be shortened.

According to the DMA transfer related to this embodiment, the descriptor management device 1 divides a descriptor which indicates a reference area of memory in reading data into a plurality of sub-descriptors, and allocates the sub-descriptors to a plurality of DMA controllers 4, as shown in FIG. 9. Each DMA controller 4 which receives a sub-descriptor implements the processing of data reading using the sub-descriptor. In the example shown in FIG. 9, the descriptor management device 1 gives an instruction of DMA transfer starting to the DMA controllers (0), (1), and (2) which are in the idle status, and reads the data of 10/3=3.3K bytes from memory based on the sub-descriptor.

In the memory controller 5 which implements the processing of data reading, it is necessary to implement the advance-preparation processing and wait to acquire the right to use the control bus 6 and the data bus 7 before taking out data actually from the memory 3 and implementing the processing of storing the data in the pre-fetch buffers in the memory controller 5. Even in data reading for one descriptor, it is possible to implement the advance-preparation processing and the processing of waiting for the assignment of the right to use the buses in duplication in terms of time in a plurality of buffer circuits by receiving a data reading request in parallel from a plurality of DMA controllers 4 which receive sub-descriptors and implementing the advance-preparation processing and the waiting processing until the right to use the buses is assigned, in parallel. As a result, in the memory controller 5, each buffer circuit can implement the processing of data reading immediately when the right to use the buses is assigned, and memory latency which inevitably arises there from can be absorbed, and the period in which the buses are not used can be shortened. Thus, it is possible to improve throughput in DMA transfer.

In the aforesaid embodiment, the division number of a descriptor is described as three, but is not limited to three. For example, the total number of DMA controllers 4 connected to the descriptor management device 1 may be made the diving number of a descriptor. It is possible to improve throughput as a DMA system to a maximum extent by dividing a descriptor by a maximum number. Or, a descriptor may be made to be divided by the total number of the DMA controller 4 which is judged to be in the idle status in the DMA management unit 13. At a certain time, a descriptor is divided by the number of DMA controllers which are in the status in which DMA transfer can be implemented. By so doing, it is possible to improve the throughput to a maximum extent at that point of time.

Moreover, in the embodiment, when the memory controller 5 has completed advance-preparation processing and is in the status of waiting for the right to use buses, the buffer circuits begin data reading on the occasion when the right to use buses is assigned, but the starting of data reading is not limited to such a time. By making a plurality of buffer circuits implement the processing which should be implemented before data reading in duplication in terms of time such as advance-preparation processing and processing of waiting for the assignment of the right to use buses, the efficiency in using buses greatly improves, and the same effect as this embodiment can be attained.

What is claimed is:

1. A DMA apparatus which reads a descriptor and data from memory corresponding to a descriptor, comprising:
   a dividing unit to divide one descriptor which is read from the memory into a plurality of sub-descriptors;
   a plurality of DMA controllers, coupled to the dividing unit to produce a plurality of reading requests to read data corresponding to the plurality of sub-descriptors from the memory; and
   a memory controller to read corresponding data from the memory according to the plurality of reading requests received in parallel from the plurality of DMA controllers,
   wherein each of the plurality of sub-descriptors is allocated to a respective one of the plurality of DMA controllers,
   each of the plurality of DMA controllers reads the data corresponding to the plurality of sub-descriptors from the memory and performs an advance-preparation processing of reading data by turns, and
   while one of the plurality of DMA controllers performs processing of reading data from the memory, at least another of the DMA controllers performs the advance-preparation processing, and the plurality of DMA controllers perform processing of reading data continuously from the memory.

2. The DMA apparatus according to claim 1, wherein the dividing unit divides the descriptor into sub-descriptors by the number of the DMA controllers.

3. The DMA apparatus according to claim 1, wherein the dividing unit divides the descriptor into sub-descriptors by a prescribed number.

4. The DMA apparatus according to claim 1, further comprising:
   a DMA control management unit to manage statuses of the plurality of DMA controllers; and wherein
   the dividing unit divides the descriptor into sub-descriptors by the number of the DMA controllers which are determined by the DMA control management unit to be in a state where the DMA controllers can read data from the memory.

5. The DMA apparatus according to claim 1, wherein the memory controller comprises a plurality of buffer circuits;
   and the buffer circuits read data corresponding to the sub-descriptors from the memory and store the data.

6. The DMA apparatus according to claim 5, wherein the buffer circuits implement preparatory processing of reading data from the memory while some other buffer circuits are implementing the reading of data from the memory.

7. The DMA apparatus according to claim 6, wherein when the buffer circuits are assigned the right to use buses between the memory and the buffer circuits after implementing preparatory processing, the buffer circuits begin the processing of reading data from the memory.

8. The DMA apparatus according to claim 5, wherein the buffer circuits implement processing of being assigned a right to use the buses between the memory and the buffer circuits while some other buffer circuits are implementing the reading of data from the memory.

9. The DMA apparatus according to claim 5, wherein the buffer circuits implement preparatory processing of reading data from the memory, processing for being assigned a right to use buses between the memory and the buffer circuits, and part of a series of processes for reading data from the memory, overlapping with the processing of some other buffer circuits in terms of time.

10. A descriptor management device in which a plurality of DMA controllers are used for processing of reading a descriptor and data corresponding to the descriptor from memory via a memory controller, comprising:
    a reading unit to read a descriptor from the memory according to an instruction from a CPU;
    a dividing unit to divide one descriptor read into a plurality of sub-descriptors;

a transmission unit to transmit the plurality of sub-descriptors to the plurality of DMA controllers coupled to the dividing unit; and a notification unit to notify the CPU that DMA transfer has been completed when the processing of reading the data in parallel corresponding to the plurality of sub-descriptors is completed in the whole of the plurality of DMA controllers, wherein each of the plurality of sub-descriptors is allocated to a respective one of the plurality of DMA controllers, each of the plurality of DMA controllers reads the data corresponding to the plurality of sub-descriptors from the memory and performs an advance-preparation processing of reading data by turns, and while one of the plurality of DMA controllers performs processing of reading data from the memory, at least another of the DMA controllers performs the advance-preparation processing, and the plurality of DMA controllers perform processing of reading data continuously from the memory.

11. A DMA transfer method which reads data corresponding to a descriptor from memory, including:

dividing one descriptor which is read from the memory into a plurality of sub-descriptors;

producing a plurality of reading requests based on the plurality of sub-descriptors; and reading corresponding data from the memory according to the plurality of reading requests received in parallel, wherein each of the plurality of sub-descriptors is allocated to a respective one of a plurality of DMA controllers, each of the plurality of DMA controllers reads the data corresponding to the plurality of sub-descriptors from the memory and performs an advance-preparation processing of reading data by turns, and while one of the plurality of DMA controllers performs processing of reading data from the memory, at least another of the DMA controllers performs the advance-preparation processing, and the plurality of DMA controllers perform processing of reading data continuously from the memory.

12. The DMA apparatus according to claim 1, further comprising:

a DMA control management unit to manage statuses of the plurality of DMA controllers; and a descriptor control unit for determining statuses of the plurality of DMA controllers based on information notified by the DMA control management unit and transmitting the plurality of reading requests to the memory controller if the statuses of a predetermined number of the DMA controllers are determined to be idle statuses.

* * * * *